(12) United States Patent
Baumann (10) Patent No.: US 7,562,937 B2
(45) Date of Patent: Jul. 21, 2009

(54) SEAT SUPPORT APPARATUS WITH TORQUE SUPPORT

(75) Inventor: Jürgen Baumann, Ludwigshafen-Bodman (DE)

(73) Assignee: RECARO Aircraft Seating GmbH & Co. KG, Schwäbisch Hall (DE)

(*) Notice: Subject to any disclaimer, the term of this patent is extended or adjusted under 35 U.S.C. 154(b) by 381 days.

(21) Appl. No.: 11/365,611

(22) Filed: Mar. 2, 2006

(65) Prior Publication Data

US 2007/0132303 A1    Jun. 14, 2007

(30) Foreign Application Priority Data

Dec. 10, 2005  (DE)  .................. 10 2005 059 134

(51) Int. Cl.
A47C 7/02    (2006.01)
(52) U.S. Cl. .................. 297/452.2; 297/452.18
(58) Field of Classification Search .......... 297/232, 297/452.18, 452.2, 216.1; 248/618
See application file for complete search history.

(56) References Cited

U.S. PATENT DOCUMENTS

| | | | | |
|---|---|---|---|---|
| 3,343,870 A * | 9/1967 | Thatcher et al. | ............. | 297/232 |
| 3,466,085 A * | 9/1969 | Stone et al. | ............ | 297/68 |
| 3,785,600 A * | 1/1974 | Padovano | ............. | 248/188.1 |
| 3,887,230 A * | 6/1975 | Groning et al. | ............. | 297/232 |
| 4,277,101 A * | 7/1981 | Vogel | ............. | 297/232 |
| 4,336,868 A * | 6/1982 | Wilson et al. | ............. | 188/376 |
| 4,498,649 A * | 2/1985 | Toll | ............. | 244/118.6 |
| 4,526,421 A * | 7/1985 | Brennan et al. | ............. | 297/232 |
| 4,938,527 A * | 7/1990 | Schmale et al. | ............. | 297/216.13 |
| 5,069,505 A * | 12/1991 | Amthor et al. | ............. | 297/216.2 |
| 5,382,036 A * | 1/1995 | Counts et al. | ............. | 280/250.1 |
| 5,522,640 A * | 6/1996 | Bilezikjian | ............. | 297/216.2 |
| 5,553,923 A * | 9/1996 | Bilezikjian | ............. | 297/452.2 |
| 5,655,816 A * | 8/1997 | Magnuson et al. | ............. | 297/452.2 |
| 5,890,768 A * | 4/1999 | Beurteaux et al. | ............. | 297/463.1 |
| 5,988,757 A * | 11/1999 | Vishey et al. | ............. | 297/452.31 |
| 6,059,369 A * | 5/2000 | Bateson et al. | ............. | 297/452.18 |
| 6,074,004 A * | 6/2000 | Carmichael | ............. | 297/216.14 |
| 6,095,603 A * | 8/2000 | Hock | ............. | 297/232 |
| 6,375,268 B2 * | 4/2002 | Okazaki et al. | ............. | 297/452.18 |
| 6,423,388 B1 * | 7/2002 | Bateson et al. | ............. | 428/36.3 |
| 7,066,551 B2 * | 6/2006 | Johnson | ............. | 297/452.18 |
| 7,073,858 B2 * | 7/2006 | Fisher et al. | ............. | 297/232 |
| 7,434,877 B2 * | 10/2008 | Herold et al. | ............. | 297/232 |

FOREIGN PATENT DOCUMENTS

DE    197 56 252 A1    7/1998
EP    0 442 765 A1    8/1991

* cited by examiner

*Primary Examiner*—David Dunn
*Assistant Examiner*—Tania Abraham
(74) *Attorney, Agent, or Firm*—Posz Law Group, PLC (57) ABSTRACT

A seat support apparatus includes a seat supporting beam unit which, to absorb a torque, has at least two force-absorbing elements, the longitudinal axes of which intersect in an intersecting point above at least one top side of the seat supporting beam unit.

26 Claims, 9 Drawing Sheets

SEAT SUPPORT APPARATUS WITH TORQUE SUPPORT

CROSS REFERENCE TO RELATED APPLICATION

This application is related to, claims priority from and incorporates herein by reference German Patent Application No. DE 10 2005 059 134.5, filed on Dec. 10, 2005.

FIELD OF THE INVENTION

The invention relates generally to seat attachment apparatuses, and particularly to an aircraft seat attachment apparatus including a seat supporting beam unit with force-absorbing elements.

BACKGROUND OF THE INVENTION

U.S. Pat. No. 6,672,661 B2 discloses a seat support apparatus for supporting or for securing airplane seats in an airplane, which apparatus has two tubular seat supporting beam units arranged one behind the other in the sitting direction. The seat supporting beam units are aligned transversely with respect to the sitting direction and are fitted into round recesses of support legs.

SUMMARY OF THE INVENTION

It is an object of the present invention to provide a seat support apparatus which is particularly space-saving and is advantageously suitable for loads which occur.

A seat support apparatus is proposed with a seat supporting beam unit which, to absorb a torque, has at least two force-absorbing elements, the longitudinal axes of which intersect in an intersecting point above at least one top side of the seat supporting beam unit. A particularly space-saving seat support apparatus with an individual seat supporting beam unit can advantageously be provided. The seat supporting beam unit is advantageously arranged in the central region of a seat region in the sitting direction. The invention is based on the finding that, in the case of a corresponding arrangement, in particular in the case of a positive or in the case of a negative acceleration in the sitting direction over the seat supporting beam unit, a torque has to be supported. In this case, the torque arises essentially from a mass force of inertia from the weight of a passenger or of a plurality of passengers sitting next to one another times a lever arm between a mass center of gravity of the passenger or the passengers and the seat supporting beam unit, which mass center of gravity is situated above the top side of the seat supporting beam unit. By means of the force-absorbing elements according to the invention, bending forces caused by the torque can be at least largely avoided in the seat supporting beam unit, or the torque can at least largely be supported in the force-absorbing elements via axial forces, to be precise, in particular, if—as viewed in the fitted position—the intersecting point of the longitudinal axes of the force-absorbing elements is at a vertical distance from the top side of the seat supporting beam unit of smaller than 150 cm or the intersecting point is situated as close as possible in the vertical direction to a generally arising mass center of gravity. Furthermore, in the case of a corresponding alignment of the force-absorbing elements, an advantageous compensation of forces can be obtained in the seat supporting beam unit.

The force-absorbing elements may be formed by differently designed elements appearing expedient to the person skilled in the art, such as, for example, elements fitted onto a hollow profile, formed by hollow profile walls and/or by elements placed in a hollow profile. However, at least one force-absorbing element is particularly advantageously designed such that it protrudes with respect to an outer side of the seat supporting beam unit, as a result of which a particularly advantageous, structurally simple connection of two sides of a component adjoining the seat supporting beam unit can be achieved.

In a further refinement of the invention, it is proposed that at least one force-absorbing element is designed such that it protrudes over a lower side of the seat supporting beam unit, as a result of which, in particular, support legs can advantageously be connected to the seat supporting beam unit. In principle, however, force-absorbing elements may also be designed such that they protrude over the top side of the seat supporting beam unit, for example in order to secure armrest constructional units.

The force-absorbing elements may be formed by additional components secured on a basic body element of the seat supporting beam unit. However, at least one force-absorbing element is advantageously molded, at least partially integrally, onto a basic body element of the seat supporting beam unit, as a result of which additional components, component intersections, outlay on installation and costs can be reduced. In this case, "basic body element of the seat supporting beam unit" is to be understood as meaning in particular an element which extends at least over 20%, preferably over 40% and particularly preferably over 50% of an entire length of the seat supporting beam unit.

Furthermore, it is proposed that the seat supporting beam unit has at least one formation provided for an interlocking connection. In this case, a "formation" is to be understood in particular as meaning a groove and/or an extension. By means of an appropriate configuration, forces additionally in effect can advantageously be supported, and a particularly secure connection to an adjacent component can be achieved.

The seat supporting beam unit is preferably at least partially formed by a hollow profile, thus making it possible to obtain a particularly lightweight construction which nevertheless is suitable for absorbing large forces. In this case, the seat supporting beam unit can have different profile shapes over its longitudinal extent, in particular the seat supporting beam unit can be of at least substantially cylindrical design in individual regions, so that a particularly advantageous transmission of torque in the longitudinal direction of the seat supporting beam unit can be achieved in these regions.

If at least one stiffening means is arranged within the hollow profile, bulges in the event of loading can advantageously at least largely be avoided. All stiffening means appearing expedient to the person skilled in the art are conceivable here. However, means which are aligned transversely with respect to the longitudinal extent of the seat supporting beam unit and are formed in the manner of a partition are particularly advantageously suitable.

If the seat supporting beam unit is formed by at least two basic body elements, greater creative scope can be provided in comparison to a seat supporting beam unit with just one individual basic body element. In this case, the seat supporting beam unit may be designed such that it is divided transversely with respect to the longitudinal direction and/or advantageously in the longitudinal direction.

If at least one basic body element of the seat supporting beam unit has material wall thicknesses differing in size, material wall thicknesses differing in size can advantageously be assigned to loads differing in size.

In a further refinement of the invention, it is proposed that the seat supporting beam unit is at least partially formed from a fiber material, such as particularly advantageously from a carbon fiber reinforced plastic (CFP), thus enabling a particularly lightweight construction to be achieved. As an alternative, aluminum is advantageously appropriate.

If the seat supporting beam unit is produced by a plurality of insert mats, the material wall thicknesses and in particular also the fiber alignments can be matched in a particularly simple manner to different loads.

BRIEF DESCRIPTION OF THE DRAWINGS

Further advantages emerge from the description below of the drawings. The drawings illustrate an exemplary embodiment of the invention. The drawings, the description and the claims contain numerous features in combination.

One skilled in the art will expediently also consider the features individually and put them together to form meaningful further combinations.

In the drawings.

DETAILED DESCRIPTION OF THE PREFERRED EMBODIMENTS

Figure 1:
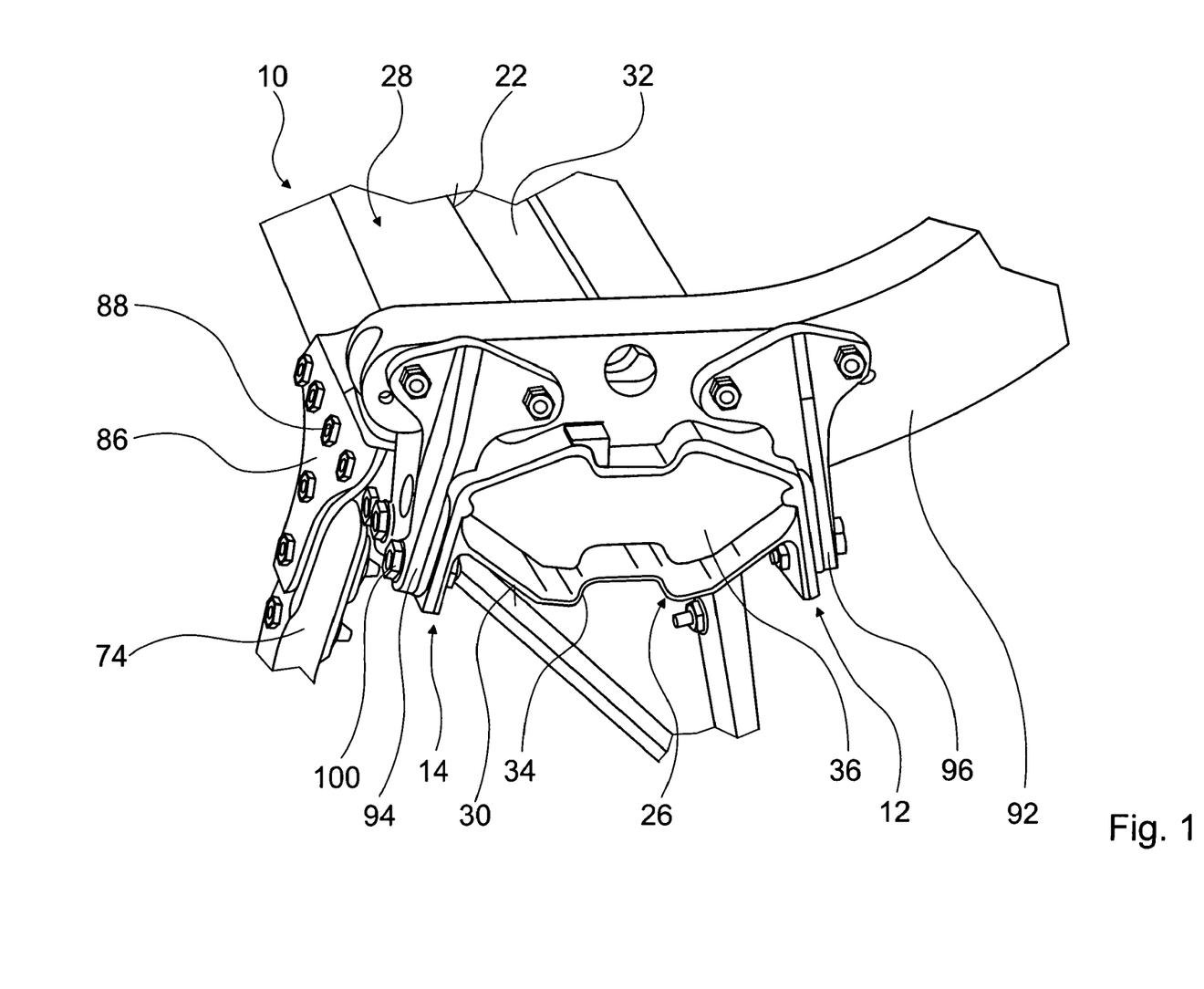
FIG. 1 shows an excerpt of a seat support apparatus with a seat supporting beam unit obliquely from above.
Figure 2:
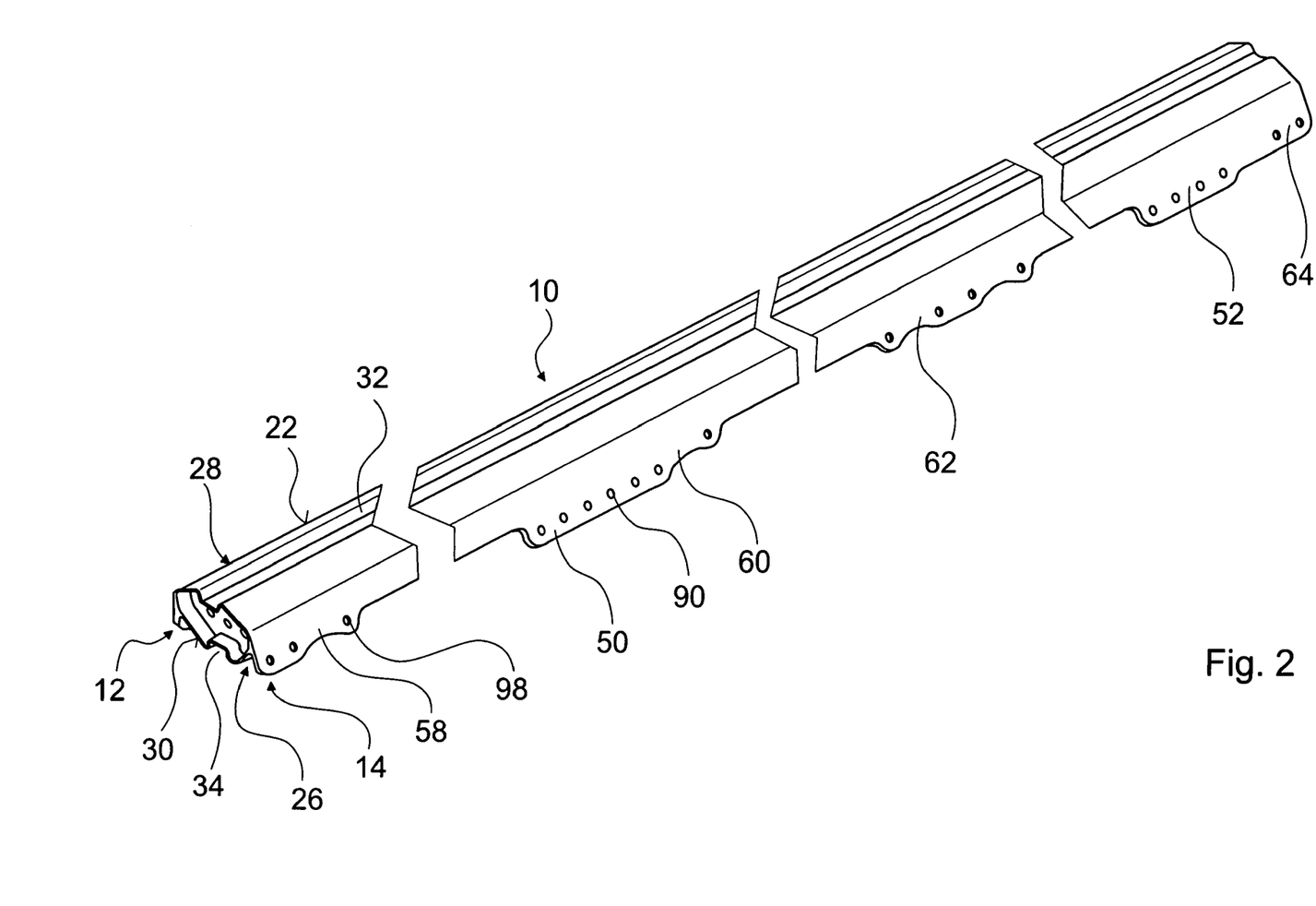
FIG. 2 shows the seat supporting beam unit in a detached position obliquely from above.
Figure 6:
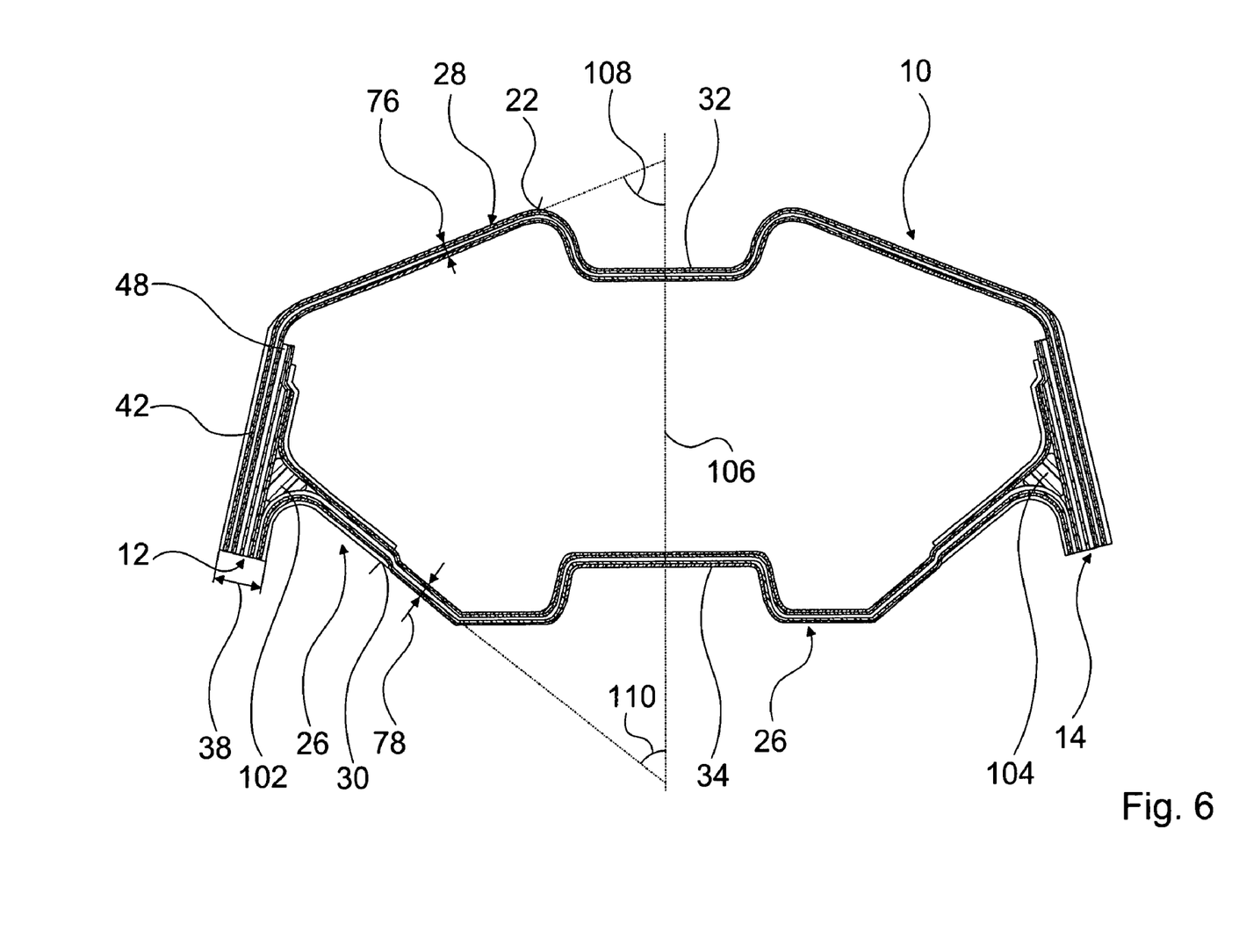
FIG. 6 shows a section along the line VI—VI in FIG. 3.
Figure 7:
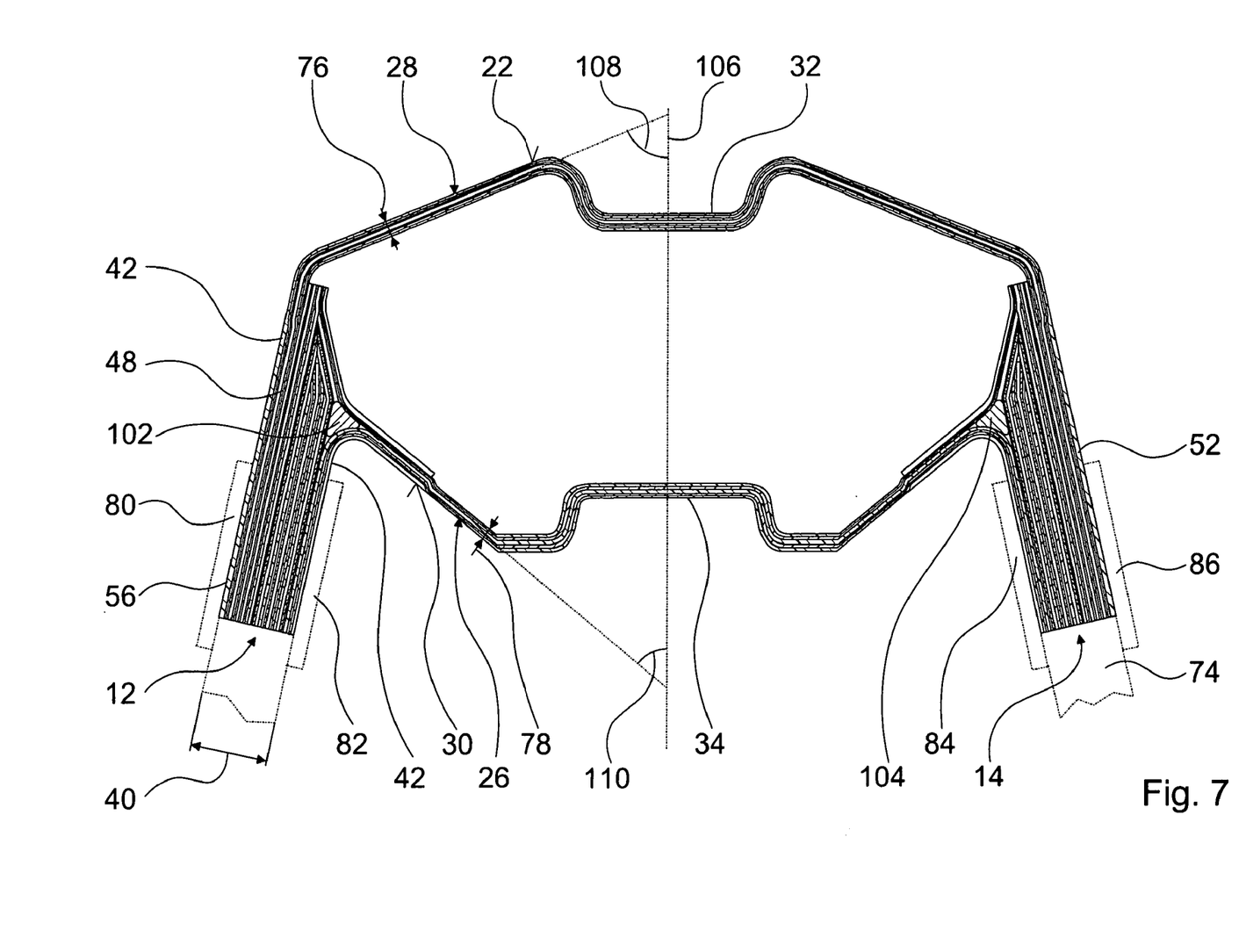
FIG. 7 shows a section along the line VII—VII in FIG. 3.

FIG. 1 shows an excerpt of a seat support apparatus with an individual transverse support which is formed by a seat supporting beam unit 10 and is intended for supporting a total of three airplane seats, which are situated in a row, on a cabin floor of an airplane. The seat supporting beam unit 10 has two half-shell-like basic body elements 26 which are joined together by means of an adhesive connection 48 to form a hollow profile, the lower half-shell-like basic body element 26—as viewed in the fitted position—being pushed into the upper half-shell-like basic body element 28—as viewed in the fitted position (FIGS. 6 and 7).

Figure 5:
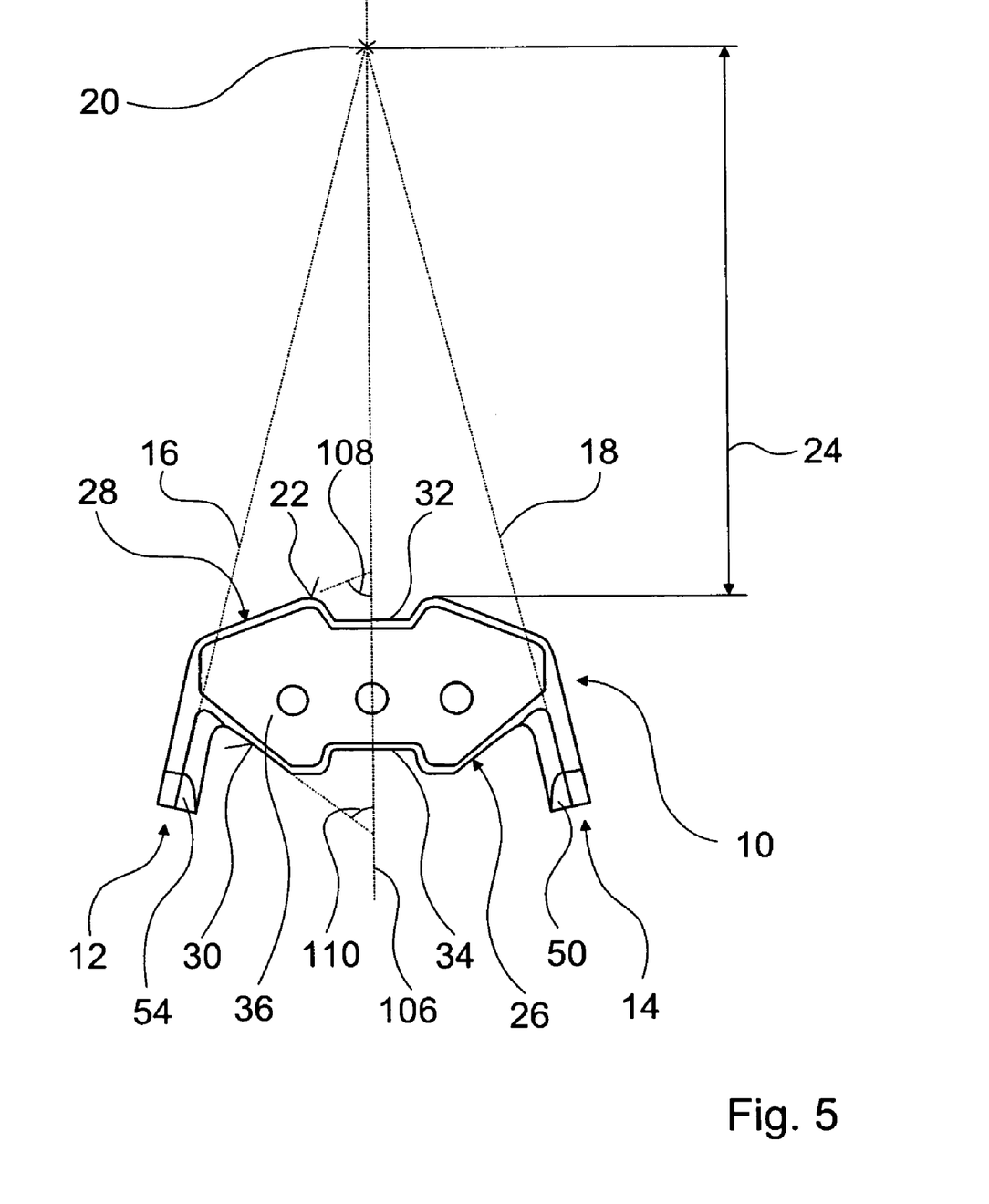
FIG. 5 shows a view in the direction V in FIG. 3.

To absorb a torque, two web-like force-absorbing elements 12, 14, which extend over the entire length of the seat supporting beam unit 10 and are of a multi-layered construction, are molded integrally onto the multi-layered basic body elements 26, 28, which are produced by carbon fiber reinforced plastic insert mats 42, the longitudinal axes 16, 18 of which force-absorbing elements intersecting in an intersecting point 20 above a top side 22 of the seat supporting beam unit 10 in the region of a center of gravity probably arising in the case of occupied airplane seats, and therefore forming an advantageous triangle for absorbing the torque (FIG. 5). The intersecting point 20 is situated between a seat floor surface (not illustrated specifically) of the airplane seats and an upper edge of a backrest (likewise not illustrated) of the airplane seats or is at a vertical distance 24 of approx. 40 cm from the top side 22 of the seat supporting beam unit 10. However, different vertical distances are also conceivable depending on different boundary conditions.

The force-absorbing elements 12, 14 are designed such that they protrude with respect to a lower side 30 of the basic body element 26 of the seat supporting beam unit 10. The seat supporting beam unit 10—as viewed in the fitted position—is of mirror-symmetrical design essentially with respect to its vertically running center axis 106 which intersects the longitudinal axes 16, 18 likewise in the intersecting point 20 (FIG. 5). Walls of the basic body element 28 that essentially adjoin the force-absorbing elements 12, 14 are aligned obliquely with respect to the center axis 106 or enclose an angle 108 of approx. 70° with respect thereto. Walls of the basic body element 26 which essentially adjoin the force-absorbing elements 12, 14 are likewise aligned obliquely with respect to the center axis 106 or enclose an angle 110 of approx. 50° with respect to the latter. In principle, however, other angles appearing expedient to the person skilled in the art, in particular of between 10° and 80°, are also conceivable.

The force-absorbing elements 12, 14 each have two coupling regions 50, 52, 54, 56 for the securing of support legs 74 (FIGS. 1 to 5). Furthermore, the force-absorbing elements 12, 14 each have four coupling regions 58, 60, 62, 64, 66, 68, 70, 72 for the securing of seat dividers 92 forming armrests.

Between the coupling regions 50 to 72, the force-absorbing elements 12, 14 have material wall thicknesses 38 which are approx. 3.5 times the size of a material wall thickness 76, 78 of the basic body elements 26, 28 in regions outside the force-absorbing elements 12, 14 (FIG. 6). In the coupling regions 58 to 72 for securing the seat dividers 92 forming the armrests, the force-absorbing elements 12, 14 have essentially the same material wall thicknesses as between the coupling regions 50 to 72, but the force-absorbing elements 12, 14 in the coupling regions 58 to 72 are of basically longer design than in the regions between the coupling regions 50 to 72. In the coupling regions 50 to 56 for securing the support legs 74, the force-absorbing elements 12, 14 have material wall thicknesses 40 which are approx. 2 times the size of the material wall thickness 38 in the region between the coupling regions 50 to 72 or in the coupling regions 58 to 72. Furthermore, the force-absorbing elements 12, 14 in the coupling regions 50 to 56 are in turn of longer design than in the coupling regions 58 to 72 (FIGS. 1 to 7).

The support legs 74 have securing plates 80, 82, 84, 86 adjoining the force-absorbing elements 12, 14 in the coupling regions 50 to 56 on each side in the sitting direction, as is indicated in particular in FIG. 7 and of which one can be seen in FIG. 1. The securing plates 80, 82, 84, 86 are clamped against the force-absorbing elements 12, 14 by securing screws 88 reaching through the coupling regions 50 to 56 or through holes 90 in the force-absorbing elements 12, 14. By contrast, the seat dividers 92 forming the armrests have securing plates 94, 96 (FIG. 1) which are adjacent to the force-absorbing elements 12, 14 in the coupling regions 58 to 72 just on one side in each case in the sitting direction and are clamped against the force-absorbing elements 12, 14 by securing screws 100 reaching through the coupling regions 58 to 72 or through holes 98 in the force-absorbing elements 12, 14.

In order to obtain advantageous interlocking connections, a formation 32 is also molded onto the upper basic body element 28, as viewed in the fitted position, on the top side 22 thereof, which formation is formed by a groove extending over the entire length of the seat supporting beam unit 10 (FIGS. 1 to 7). Furthermore, a formation 34 is molded onto the lower basic body element 26, as viewed in the fitted position, on the lower side 30 thereof, and is likewise formed by a groove extending over the entire length of the seat supporting beam unit 10.

Figure 3:
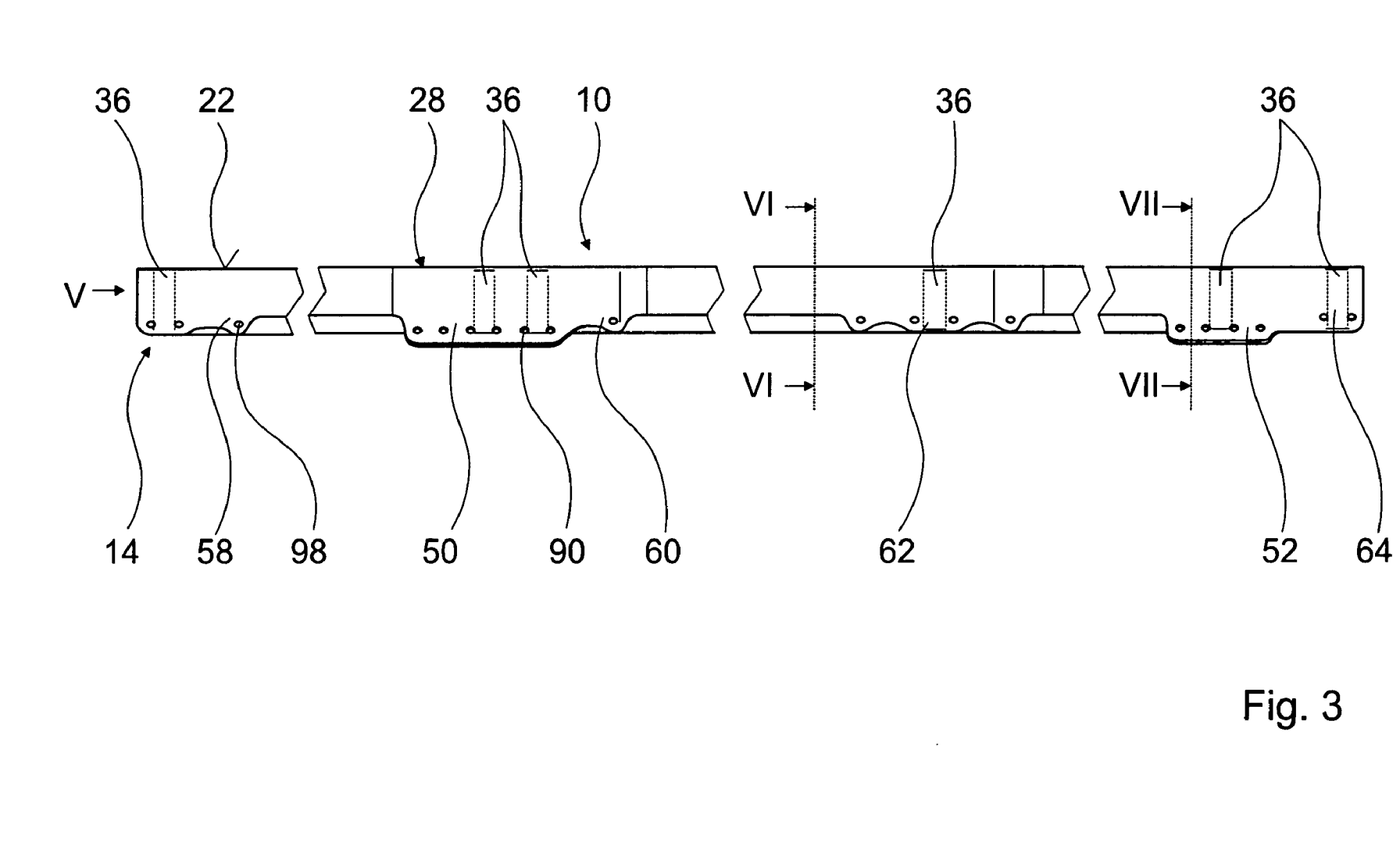
FIG. 3 shows the seat supporting beam unit in a side view.
Figure 4:
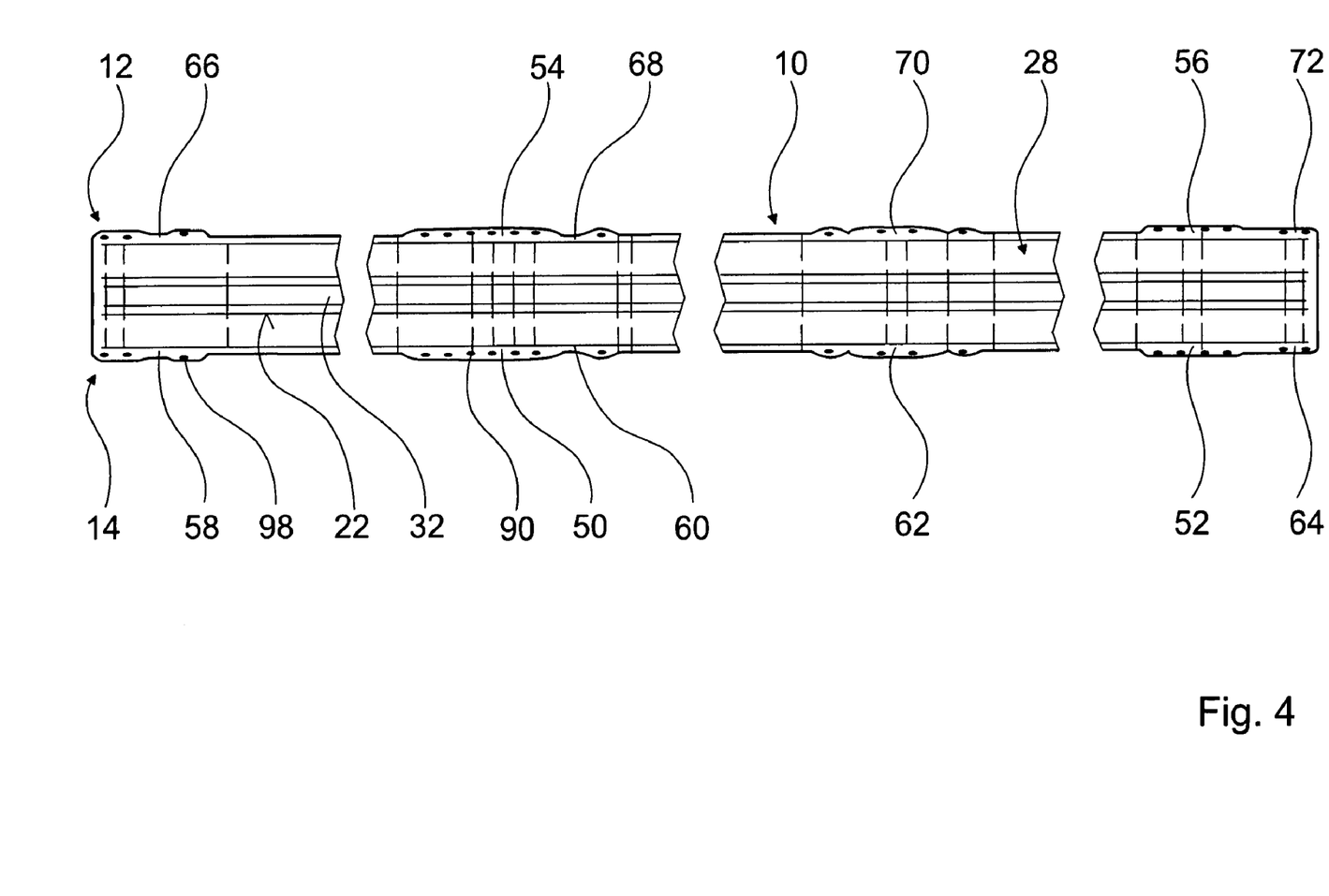
FIG. 4 shows the seat supporting beam unit in a view from above.

In order to avoid bulges in the region of the coupling regions 50 to 56, stiffening means 36 which are in particular in the manner of a partition in these regions and run transversely with respect to the longitudinal direction of the seat supporting beam unit 10 are molded integrally onto the lower basic body element 26, as viewed in the fitted position (FIGS. 1 and 3).

Figure 8:
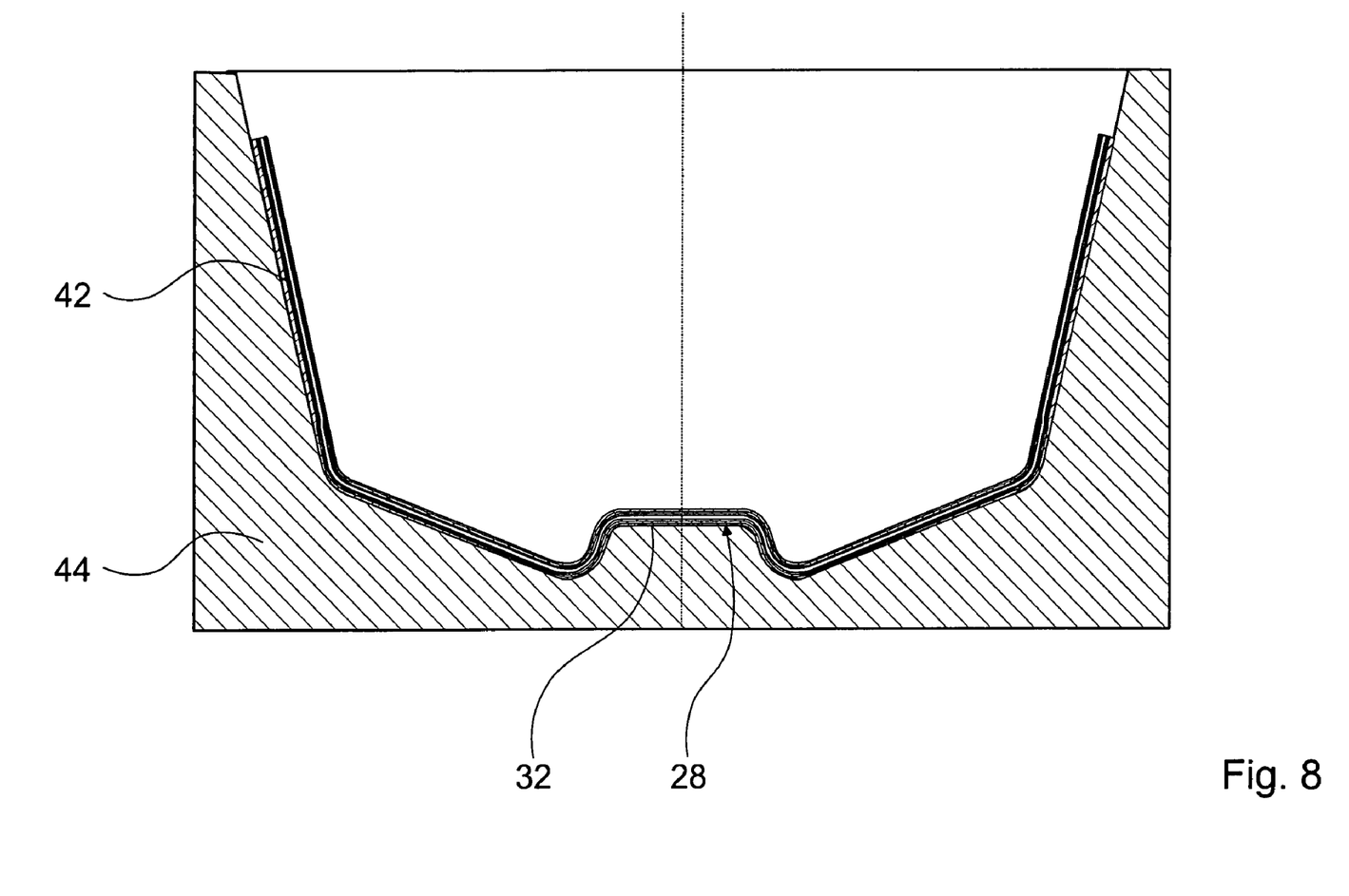
FIG. 8 shows a first part of the seat supporting beam unit from FIG. 1 during production.
Figure 9:
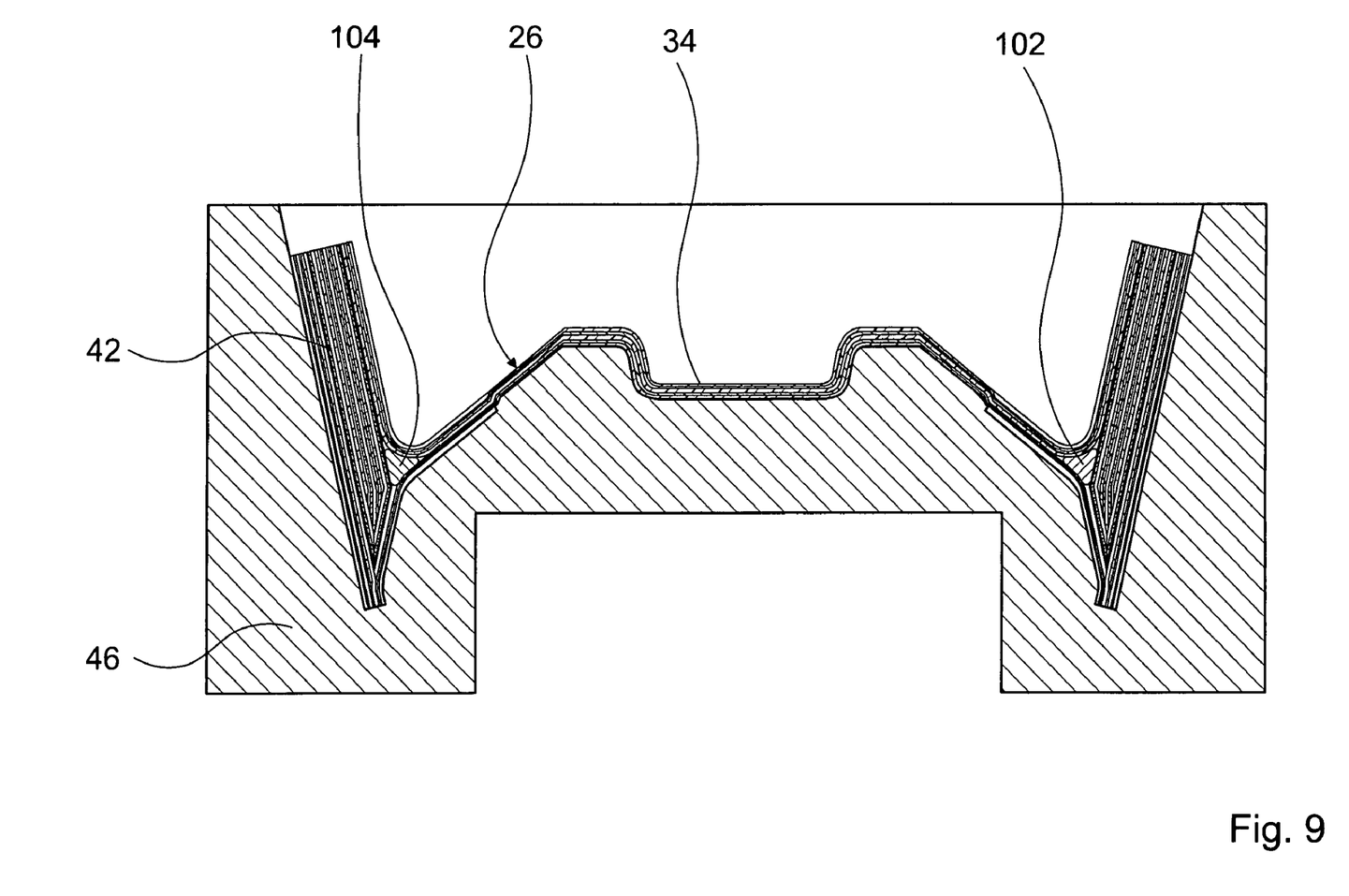
FIG. 9 shows a second part of the seat supporting beam unit from FIG. 1 during production.

FIGS. 8 and 9 show the seat supporting beam unit 10 during production. Here, carbon fiber reinforced plastic insert mats 42 are placed into a mold 44 for producing the upper basic body element 28 and carbon fiber reinforced plastic insert mats 42 are placed into a mold 46 for producing the lower basic body element 26. In order to obtain different material wall thicknesses 38, 40, 76, 78, in particular also in order to obtain the different material wall thicknesses 38, 40 of the force-absorbing elements 12, 14, different numbers of carbon fiber reinforced plastic insert mats 42 are placed in different regions. Furthermore, the carbon fiber reinforced plastic insert mats 42 are placed in a differently aligned manner with respect to their fiber alignments in different regions in order to match a matching of the seat supporting beam unit 10 to different loads occurring in the different regions during operation. In order as far as possible to avoid a clearance in lateral corner regions of the lower basic body element 26, as viewed in the fitted position, an insert body 102, 104 which is essentially triangular in cross section is placed in each case in the corner regions.

The invention claimed is:

1. A seat support apparatus comprising:
   a seat supporting beam unit configured to support at least two seats and comprising a basic body element with a longitudinal direction and at least two force-absorbing elements for absorbing a torque;
   at least one seat divider; and
   at least one support leg;
   wherein
   the two force-absorbing elements have a longitudinal direction oriented in the longitudinal direction of the basic body element and have lateral axes which intersect in an intersecting point above at least one top side of the seat supporting beam unit, the force absorbing-elements each have at least one first coupling region for the securing of the seat divider and the force-absorbing elements each have at least one second coupling region for the securing of the support leg, and
   at least one force-absorbing element is designed such that it protrudes, with respect to an outer side of the basic body element of the seat supporting beam unit, downwardly along its lateral axes over a lower side of the basic body element.

2. The seat support apparatus as claimed in claim 1, wherein the intersecting point is at a vertical distance from the top side of smaller than 150 cm.

3. The seat support apparatus as claimed in claim 1, wherein at least one force-absorbing element is designed such that it protrudes downwards along its lateral axes with respect to an outer side of the basic body element of the seat supporting beam unit.

4. The seat support apparatus as claimed in claim 1, wherein at least one force-absorbing element is molded, at least partially integrally, onto the basic body element of the seat supporting beam unit.

5. The seat support apparatus as claimed in claim 1, wherein the seat supporting beam unit is at least partially formed by a hollow profile.

6. The seat support apparatus as claimed in claim 5, which comprises at least one stiffening means arranged within the hollow profile.

7. The seat support apparatus as claimed in claim 1, wherein the seat supporting beam unit is formed by at least two basic body elements.

8. The seat support apparatus as claimed in claim 1, wherein the basic body element of the seat supporting beam unit has material wall thicknesses differing in size.

9. The seat support apparatus as claimed in claim 1, wherein the seat supporting beam unit is at least partially formed from a fiber material.

10. The seat support apparatus as claimed in claim 9, wherein the seat supporting beam unit comprises a plurality of insert mats.

11. The seat support apparatus as claimed in claim 1, wherein the seat divider forms an armrest.

12. The seat support apparatus as claimed in claim 1, wherein the force-absorbing elements each have a region, which is built straight in a downward direction along the lateral axes of the respective force-absorbing element and forms at least one of the coupling regions.

13. The seat support apparatus as claimed in claim 1, wherein the force-absorbing elements each have a region, which is built straight in a downward direction along the lateral axes of the respective force-absorbing element and which forms the first and the second coupling region.

14. The seat support apparatus as claimed in claim 13, wherein a force from the seat divider can be transmitted to the support leg via one of the force-absorbing elements along a straight line parallel to the lateral axes of the force-absorbing element.

15. The seat support apparatus as claimed in claim 1, wherein the first coupling region is arranged spatially apart from the second coupling region in the longitudinal direction of the basic body element.

16. The seat support apparatus as claimed in claim 1, wherein the support leg has at least one securing means adjoining a contact surface of one of the force-absorbing elements in the second coupling region of the force-absorbing element and wherein the contact surface is built straight in a downward direction along the lateral axes of the force-absorbing element.

17. The seat support apparatus as claimed in claim 16, wherein the securing means is built as a plate which is clamped against the force-absorbing element.

18. The seat support apparatus as claimed in claim 1, wherein the seat divider has at least one securing means adjoining a contact surface of one of the force-absorbing elements in the first coupling region of the force-absorbing element and wherein the contact surface is built straight in a downward direction along the lateral axes of the force-absorbing element.

19. The seat support apparatus as claimed in claim 18, wherein the securing means is built as a plate which is clamped against the force-absorbing element.

20. The seat support apparatus as claimed in claim 1, wherein the support leg has at least one first securing means adjoining a first contact surface of one of the force-absorbing elements in the second coupling region of the force-absorbing element, wherein the seat divider has at least one second securing means adjoining a second contact surface of the force-absorbing element in the first coupling region of the force-absorbing element and wherein the first and the second contact surfaces are each built straight in a downward direction along the lateral axes of the force-absorbing element.

21. The seat support apparatus as claimed in claim 20, wherein a force from the seat divider is transmitted to the support leg via the force-absorbing element along a straight line parallel to the lateral axes of the force-absorbing element.

22. The seat support apparatus as claimed in claim 1, wherein the force-absorbing elements extend essentially over the entire length of the seat supporting beam unit.

23. The seat support apparatus as claimed in claim 1, wherein the seat supporting beam unit is an individual seat supporting beam unit.

24. The seat support apparatus as claimed in claim 1, wherein a groove is molded onto the basic body element and extends essentially over the entire length of the seat supporting beam unit.

25. The seat support apparatus as claimed in claim 1, wherein the seat supporting beam unit has two basic body elements formed as half shells that are joined together to form a hollow profile.

26. A seat apparatus comprising:
    at least two seats; and
    a seat support apparatus comprising:
    a seat supporting beam unit configured to support the at least two seats and comprising a basic body element with a longitudinal direction and at least two force-absorbing elements for absorbing a torque;
    at least one seat divider; and
    at least one support leg;
    wherein the two force-absorbing elements have a longitudinal direction oriented in the longitudinal direction of the basic body element and have lateral axes which intersect in an intersecting point above at least one top side of the seat supporting beam unit, the force absorbing-elements each have at least one first coupling region for the securing of the seat divider and the force-absorbing elements each have at least one second coupling region for the securing of the support leg, and
    at least one force-absorbing element is designed such that it protrudes, with respect to an outer side of the basic body element of the seat supporting beam unit, downwardly along its lateral axes over a lower side of the basic body element.

* * * * *